United States Patent
Takayanagi et al.

[11] Patent Number: 5,502,801
[45] Date of Patent: Mar. 26, 1996

[54] METHOD AND SYSTEM FOR DRAWING NARROW LINES ON A COMPUTER DISPLAY

[75] Inventors: Kazunori Takayanagi, Sagamihara; Nobuyoshi Tanaka; Masaya Mori, both of Yamato, all of Japan

[73] Assignee: International Business Machines Corporation, Armonk, N.Y.

[21] Appl. No.: 298,528

[22] Filed: Aug. 30, 1994

[30] Foreign Application Priority Data

Sep. 1, 1993 [JP] Japan ............................. 5-217262

[51] Int. Cl.$^6$ ............................................. G06T 11/00
[52] U.S. Cl. ................................................ 395/143
[58] Field of Search .............................. 395/133, 134, 395/138, 140, 141, 142, 143

[56] References Cited

U.S. PATENT DOCUMENTS

| | | | |
|---|---|---|---|
| 5,095,520 | 3/1992 | Kim | 395/143 X |
| 5,202,960 | 4/1993 | Seiler | 395/143 |
| 5,293,472 | 3/1994 | Lotspiech | 395/143 |
| 5,309,553 | 5/1994 | Mukai et al. | 395/143 |
| 5,345,547 | 9/1994 | Anezaki et al. | 395/143 |

*Primary Examiner*—Almis R. Jankus
*Attorney, Agent, or Firm*—Thomas E. Tyson; John G. Graham; Andrew J. Dillon

[57] ABSTRACT

To rapidly draw straight lines and circular arcs of width 1 on a raster scan graphic display by determining whether or not the point, the X coordinate of which is incremented by 1 relative to the current point, and the point, the Y coordinate of which is incremented by 1 relative to the current point, are between the outlines f1 and f2 defining a straight line of width 1. If the point, the x coordinate of which is incremented by 1, is between the outlines f1 and f2, it is plotted and selected as the next pixel. If this is not the case, and the point, the y coordinate of which is incremented by 1, is between the outlines f1 and f2, it is plotted and selected as the next point. If neither point is between the outlines f1 and f2, the point, the x and y coordinates of which are incremented by 1, is plotted and selected as the next pixel.

4 Claims, 15 Drawing Sheets

Bresenham's straight line

Wide straight line (width 1)

$$f1(0.0) = \frac{L}{2} \quad \xrightarrow{-\Delta y} \quad f1(1.0) = -\frac{L}{2} - \Delta y \quad \xrightarrow{+\Delta x} \quad f1(1.1) = \frac{L}{2} - \Delta y + \Delta x$$

$$f2(0.0) = \frac{L}{2} \quad\quad\quad f2(1.0) = \frac{L}{2} - \Delta y \quad\quad\quad f2(1.1) = -\frac{L}{2} - \Delta y + \Delta x$$

$$f1(x, y) = \frac{x^2}{(a+0.5)^2} + \frac{y^2}{(b+0.5)^2} = 1$$

$$f2(x, y) = \frac{x^2}{(a-0.5)^2} + \frac{y^2}{(b-0.5)^2} = 1$$

xr : x coordinate of center of ellipse
yr : y coordinate of center of ellipse
a : radius in x direction of ellipse
b : radius in y direction of ellipse

METHOD AND SYSTEM FOR DRAWING NARROW LINES ON A COMPUTER DISPLAY

TECHNICAL FIELD

This invention relates to a method and a system for computationally drawing lines on a display such as a raster scan graphic display on which pixels can be individually plotted at given coordinate points and in particular to a method and a device for rapidly drawing wide lines with a width of 1 or more.

BACKGROUND ART

Conventionally, various methods for drawing lines on a computer display have been proposed. One of the typical methods is the Bresenham's algorithm. This technique is unique in that it is fast because the drawing of any gradient lines or circular arcs can be implemented without real numbers (floating point numbers) and using only integer additions, subtractions, and shift operations and that it does not require any table or memory region for temporarily storing the coordinates of each point on the lines.

On the other hand, it has been desired to draw wide lines with a width of one pixel or more on a graphic display. This is because wide lines are visually more clear than thin lines, and, more advantageously, drawing wide lines adjacently provides wider lines and also allows specific regions to be filled efficiently.

In principle, however, it is impossible to apply the Bresenham's algorithm to the drawing of wide lines because it can essentially only draw lines of width 0. Furthermore, the criteria required by those skilled in the art is that when an outline is added to a wide line which has been drawn that the wide line contains all the pixels which should be inside the outline. Even the superposition of the Bresenham's algorithm does not allow this requirement to be met, and may result in missing pixels inside the outline.

There are known the prior art that disclose various techniques for efficiently drawing wide straight lines or circular arcs.

JA PUPA (Japanese Published Unexamined Patent Application) No. 63-14286 discloses an algorithm wherein a wide line circle is drawn by repeatedly drawing a circular arc of the same radius while the center of the circle is sequentially moved in the internal direction.

JA PUPA No. 63-180182 discloses a method enabling the rapid drawing of wide lines by drawing a wide outline of any figure based on outline coordinates and wide outline information, and then filling the inside.

JA PUPA No. 63-282583 discloses a method enabling the rapid display of wide lines by providing coordinate information for only one point on the outer frame other than the center line of the wide line and width information.

JA PUPA No. 2-35580 discloses a method for providing lines having a width of a normal value by storing line specification and width data, moving the outline of the overall character so that the width of the line is equal to the line width data, and converting the outline data into bit data.

JA PUPA No. 2-208694 discloses a method for drawing lines with a certain width by creating wide line drawing element data and synthesizing the data on a frame buffer in a drawing direction as bit map data.

JA PUPA No. 4-137187 discloses a method for drawing wide lines at a precise speed by determining an upper, a middle, and a lower bit range to process a plurality of bits altogether.

However, these wide line drawing techniques require floating point operations as well as coordinate data for drawn points to be sequentially stored in a table in a memory, and thus require an extremely high throughput. Thus, even with the most recent high-performance processors, the drawing speed is still relatively slow.

DISCLOSURE OF THE INVENTION

It is therefore an object of this invention to provide a method and a system for rapidly drawing wide lines substantially using integer operations.

It is another object of this invention to provide a method and a system for drawing lines of width 1 substantially using integer operations.

It is a further object of this invention to provide a method and a system for rapidly drawing circular arcs of width 1 substantially using integer operations.

It is a still further object of this invention to provide a method and a system for rapidly drawing elliptic arcs of width 1 substantially using integer operations.

The above objects can be achieved by the following processes for wide straight lines:

An upper and a lower limit line are established for a wide line to be drawn. Given the starting and end points of the line to be drawn, the upper and lower limit lines can be defined by calculating an equation for a straight line passing the two points and offsetting the intercept in the Y axis direction of the straight line by $\pm W/2$ where W is the width of the wide line in the Y axis direction. This invention particularly deals with cases of W=1.

Then, a first pixel, the X coordinate value of which is incremented by 1 relative to the starting point, and a second pixel, the Y coordinate value of which is incremented by 1 relative to the starting point are set up, and the positional relationship between these two pixels and the upper and lower limit lines is determined.

At this point, one of the following must be executed:

(a) If the first pixel is within the wide line, it must be selected as the next pixel.

(b) If the first pixel is not within the wide line but the second pixel is within it, the second pixel must be selected as the next pixel.

(c) If neither of the above (a) nor (b) is possible, a third pixel in an oblique direction, the X and Y coordinate values of which are incremented by 1 relative to the starting point, must be selected as the next pixel.

The selected next pixel is plotted, and by using this as a reference, a first and a second pixel are determined. It is then determined whether or not the two pixels are within the wide line as stated above in order to decide the pixel to be plotted after the next. This procedure is continued until the last point is plotted.

According to another feature of this invention, it is possible to determine whether or not pixels are within a wide line area with substantially only integer operations.

According to an another feature of this invention, the above pixel selection technique can be applied to the outline of circular arcs or ellipses and substantially using only integer operations, thus allowing circular arcs or ellipses of width 1 to be rapidly drawn.

BEST MODE FOR CARRYING OUT THE INVENTION

Figure 1:
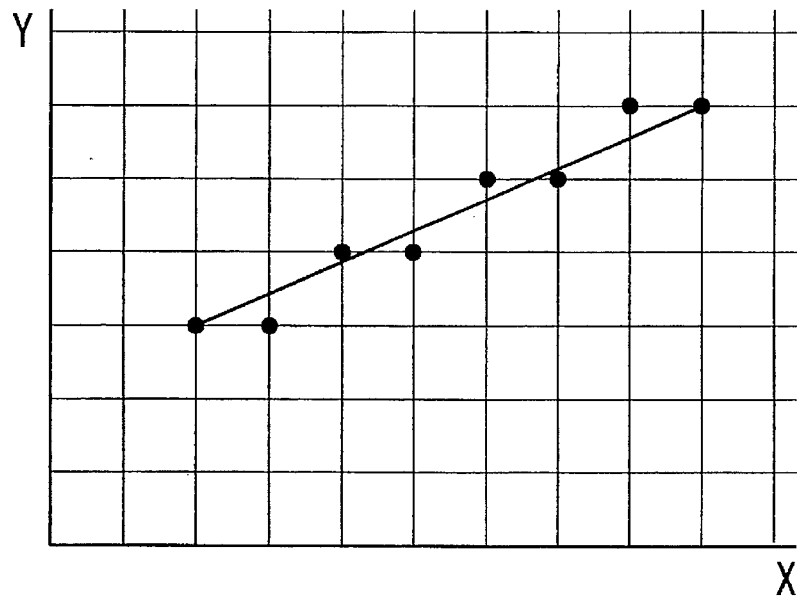
FIG. 1 is a plot of pixels drawn by the Bresenham's algorithm.

FIG. 1 shows a plot of a Bresenham's straight line. The Bresenham's straight line drawing algorithm is unique in that it allows straight lines to be drawn by using substantially only integer operations. The algorithm is well known and therefore no detailed description is given hereinafter. In FIG. 1, given that plot points are sequentially selected so that their X axis coordinate is incremented by 1, a next point to be plotted has only the X axis coordinate or both X and Y axis coordinates incremented by 1 depending upon the value of a specific parameter to be computed on an integer base.

Figure 2:
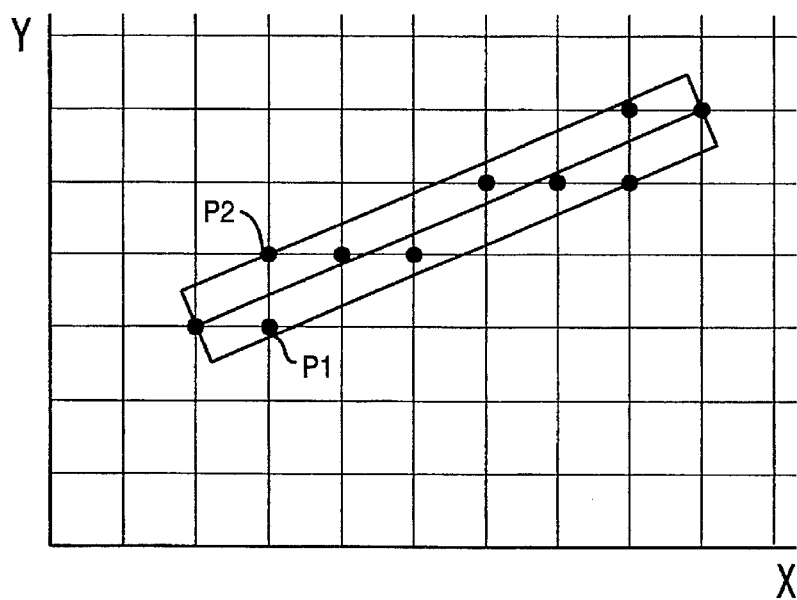
FIG. 2 is a plot of pixels in a straight line of width 1.

The Bresenham straight line drawing algorithm is sufficiently fast and also sufficiently practical if it is applied to drawing straight lines on a raster scan graphic display. However, the Bresenham straight line algorithm cannot draw straight lines of width 1 as shown in FIG. 2. This can be demonstrated as follows based on the definition of a wide straight line: The starting and end points of a wide straight line to be drawn are joined and the resultant line is used as a center to produce a rectangular outline of width W (in this case, W=1). The straight line of width 1 satisfies the conditions that (a) the starting and end points be plotted and (b) all the pixels on and within a specified rectangular outline be plotted. In FIG. 2, it is obvious that P2 is immediately above P1. In FIG. 1, however, a pixel, immediately above another pixel is never plotted. It will be understood that in principle, the Bresenham's straight line algorithm cannot be applied to wide straight lines.

Figure 3:
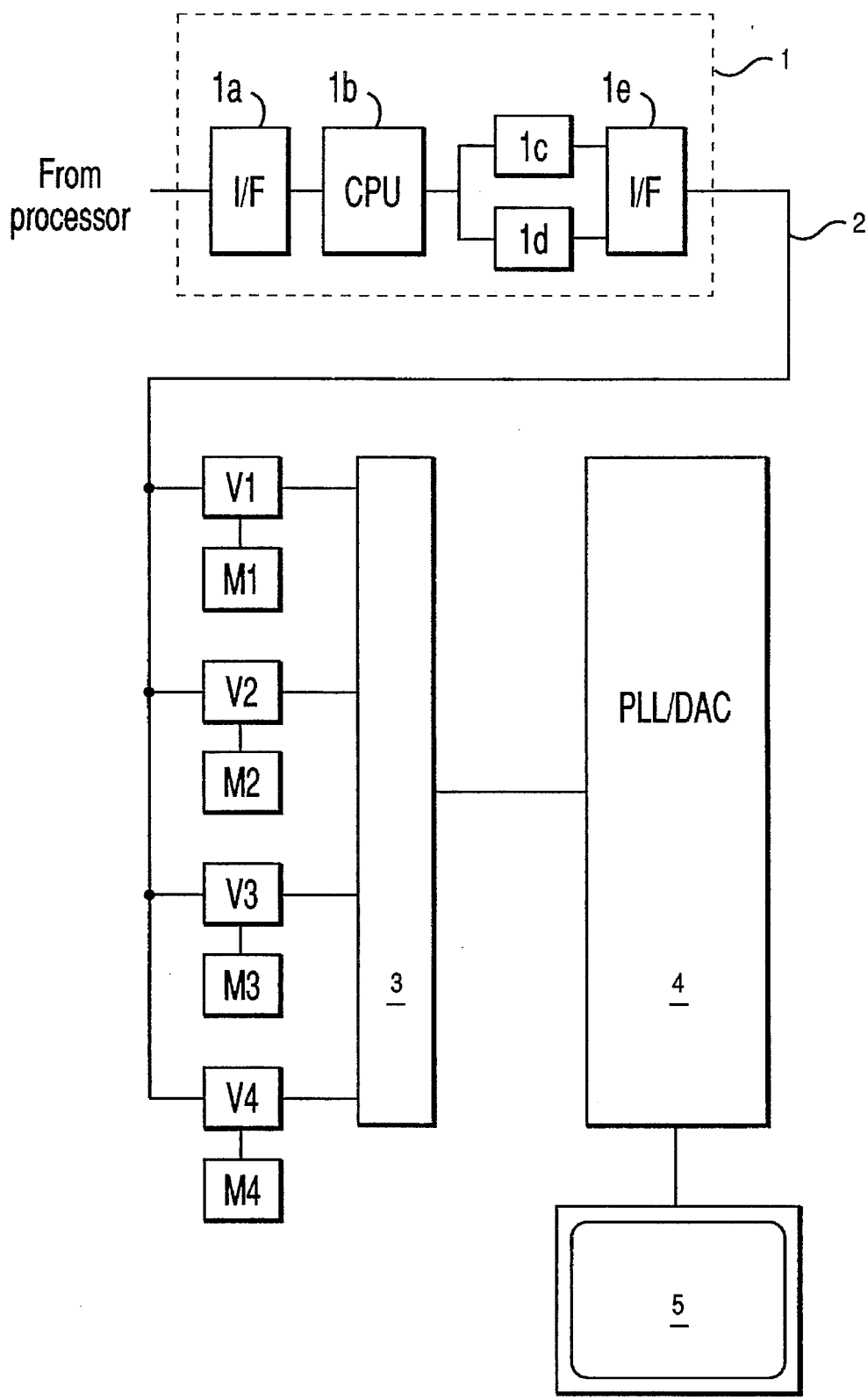
FIG. 3 is a block diagram of a hardware configuration for implementing this invention.

With reference to FIG. 3, an example of a hardware configuration for implementing this invention is described. In FIG. 3, a drawing chip 1 receives drawing instructions from a main processor (not shown) and generates the pixel data required for actual drawing. For example, when a straight line is drawn, the main processor simply passes an instruction that a straight line be drawn as well as data for the starting and end points of the line to the drawing chip 1. The chip 1 generates values for the coordinate points of individual pixels joining the starting and end points and plots pixels corresponding to coordinate points in a display APA (all point addressable) memory.

The drawing chip 1 contains an interface logic circuit 1a receiving instructions/data from the processor, a dedicated CPU 1b, a logic circuit 1c in which a drawing algorithm of this invention is implemented by means of a hard wired logic, a logic circuit 1d including generic drawing functions other than the drawing algorithm, and an interface logic circuit 1d providing interface functions for a display bus for passing data to and from the display APA memory. The logic circuit 1c and 1d are actually not separated but illustrated as such for convenience of description.

V1 to V4 are video chips prepared for different display APA memory plains and are associated with different APA memories M1 to M4. They not only write to the APA memory pixel data received from the drawing chip 1 but also read pixel data from the APA memory, perform computations for pixel data, and move pixel data between different planes.

A logic circuit 3 merges pixel color data from V1 to V4 which has been contained in the four planes and passes it to a logic circuit 4 for display. The logic circuit 4 has a programmable logic array (PLA) and a digital-analog conversion (DAC) function and provides pixel color data to a raster scan display 5 as analog data for display.

Since the hardware configuration in FIG. 3 is only one example of embodiment according to this invention, no further detailed description is given hereinafter. It should be noted that the embodiment of this invention is not limited to such a configuration. That is, the inventors attempted to draw wide lines by implementing this invention only using software on a versatile processor instead of such a hardware configuration, which also resulted in a practically high speed of drawing lines.

Figure 4:
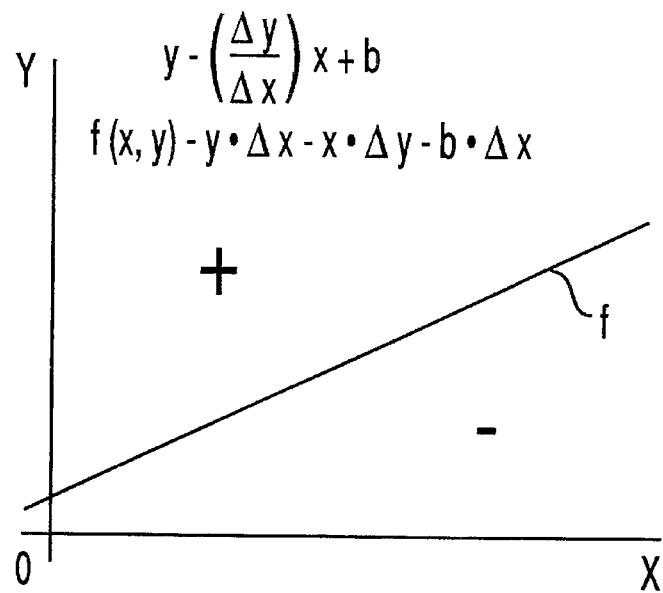
FIG. 4 illustrates the method of determining the upper and lower limits of a particular straight line.

With reference to FIG. 4, the principle of this invention is described. In FIG. 4, consider a straight line upward to the right. An equation for this straight line is generally represented as $y=(\Delta y/\Delta x)x+b$, wherein $(\Delta y/\Delta x)$ is the gradient. Using any two different points (X1, Y1) and (X2, Y2) where X2>X1 on the straight line, it is assumed that $\Delta x=X2-X1$ and $\Delta y= Y2-Y1$, b is an intercept. This equation can be modified as follows:

[Equation 1]

$$f(x, y)=y \cdot \Delta x - x \cdot \Delta y - b \cdot \Delta x$$

If a point (x0, y0) is on a straight line (f), it is obvious that f (x0, y0)=0 while if the point (x0, y0) is above the straight line (f), f (x0, y0)>0. Furthermore, if the point (x0, y0) is below the straight line (f), f (x0, y0)<0.

Figure 5:
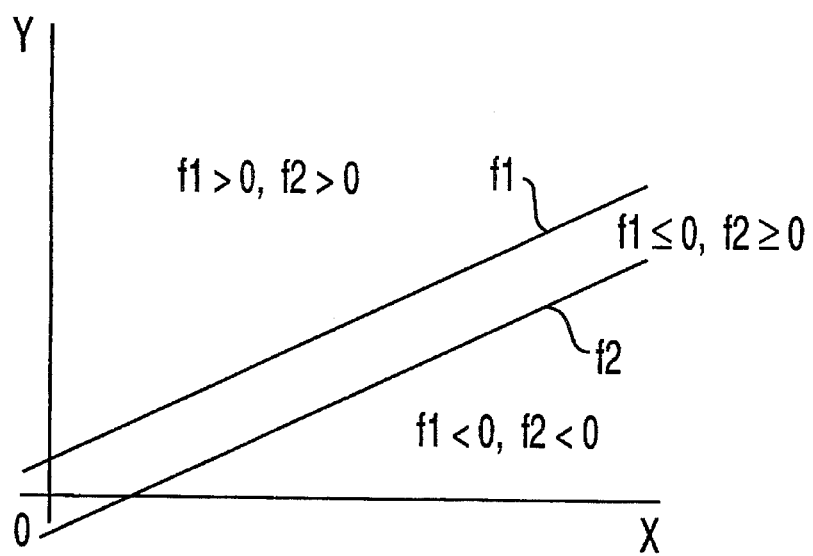
FIG. 5 illustrates the method of determining whether or not a particular point is between the upper and lower limits of a wide straight line.

Then, in FIG. 5, it is assumed that f1 is an equation (similar to the above (f)) for the upper limit outline of a wide line and that f2 is an equation for the lower limit outline. It is apparently seen that f1≦0 and f2≧0 are requirements for pixels to be plotted as a straight line.

Figure 6:
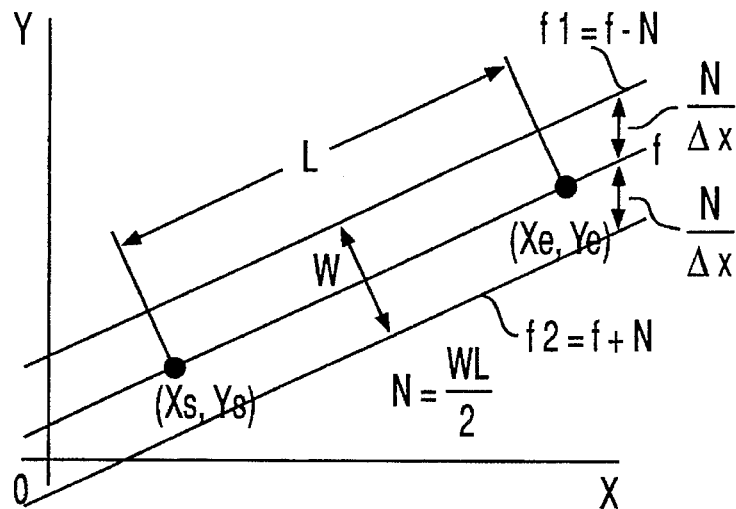
FIG. 6 illustrates the method of determining the upper limit f1 and lower limit f2 of a straight line of width 1.

Referring to FIG. 6, a method of drawing a straight line of width 1 from starting point (Xs, Ys) to end point (Xe, Ye) according to this invention is described. In FIG. 6, (f) is an equation for the straight line joining the starting point (Xs, Ys) and the end point (Xe, Ye), f1 is an upper limit outline, and f2 is a lower limit outline.

First, if Δx=Xe−Xs and Δy=Ye−Ys, f(x, y)=y·Δx−x·Δy−b·Δx as shown in Equation 1. However, if f(Xs, Ys)=f(Xe, Ye)=0 is solved for b, b·Δx=Ys·Xe−Ye·Xs=Ys·Xe−Ys·Xs+Ys· Xs−Ye·Xs=Ys·Δx−Xs·Δy. Therefore:

[Equation 2]

$$f(x, y)=y\cdot\Delta x-x\cdot\Delta y-(Ys\cdot\Delta x-Xs\cdot\Delta y)$$

Then, letting N be a positive constant, f1 and f2 will be represented as f−N and f+N, respectively. When f1 and f2 are represented by these expressions, the difference between the y intercept of f1 and that of f2 can be represented as N/Δx. The intercept is represented as a constant divided by Δx because the constant term in Equation 1 is multiplied by Δx as in −b·Δx.

A length L between the starting point (Xs, Ys) and the end point (Xe, Ye) is determined using

[Equation 3]

$$L=((Xe-Xs)^2+(Ye-Ys)^2)^{1/2}.$$

It should be noted that although calculations for L require floating point (real number) operations, this invention substantially requires only integer operations for subsequent calculations to determine the coordinates of pixels.

Once L has been determined in this way, the following proportional equation can be established based on the similarity of triangles:

[Equation 4]

$$L:\Delta x=2N/\Delta x:W$$

This proportional equation can be used to obtain an expression, N=WL/2. For this invention, W is assumed to be 1. Therefore, N=L/2. As shown in the result of Equation 3, L is a floating point number and therefore N is also a floating point number. However, since N is a value which is compared against integer values, it can be treated as an integer value by omitting the figures below the decimal point.

Figure 7:
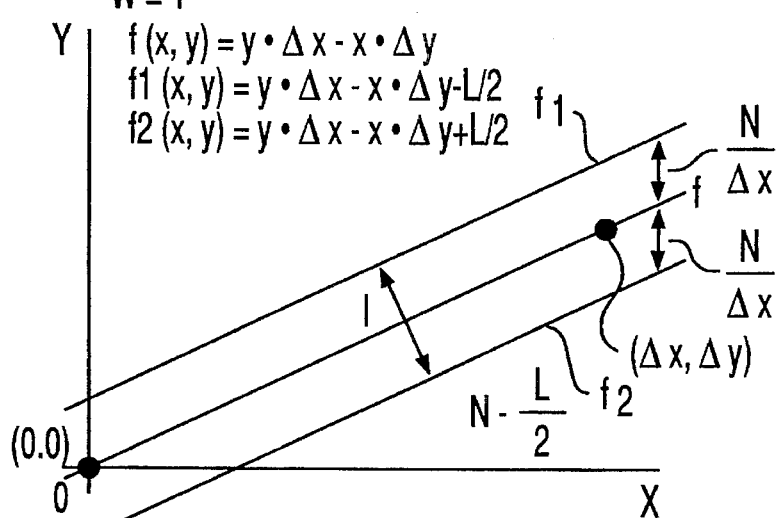
FIG. 7 illustrates the method of determining the upper limit f1 and lower limit f2 of a straight line of width 1.

Moving the starting point (Xs, Ys) to the origin (0, 0) by coordinate conversion simplifies the graph of the upper and lower limits, as shown in FIG. 7. It is obvious that such simplification never eliminates generality.

With the above arrangements, a method according to this invention of determining the coordinate points of pixels to be plotted in order to draw a spright line of width 1 is described with reference to FIG. 8 and subsequent figures.

Figure 8:
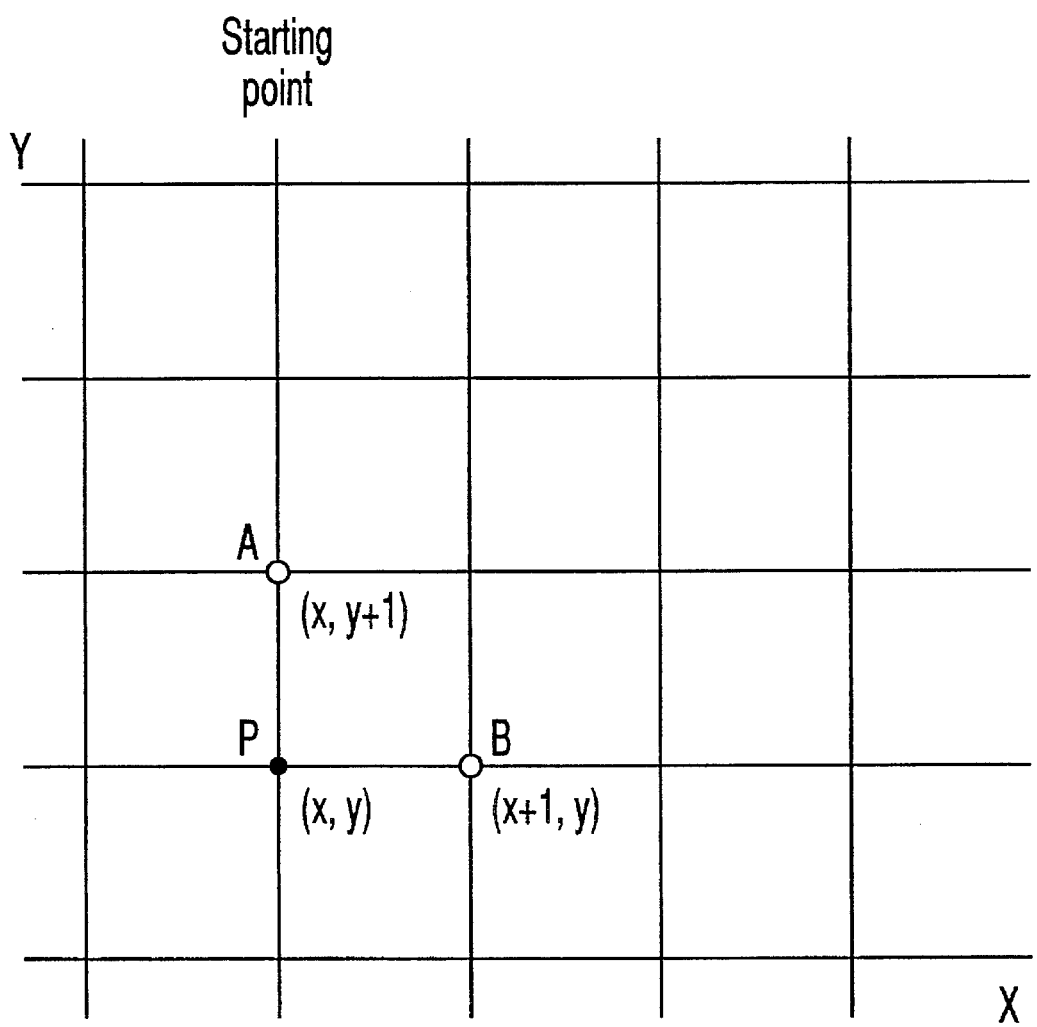
FIG. 8 illustrates points A and B which are used to determine the point next to the starting point P by determining whether or not they are between the upper limit f1 and lower limit f2.

In FIG. 8, P=(x, y) is assumed as the starting point. Then, according to the basic concept of this invention, for both the point A=(x, y+1), the y coordinate value of which is incremented by 1 relative to the starting point, and the point B=(x+1, y), the x coordinate value of which is incremented by 1 relative to the starting point, it is determined whether it is between the upper limit outline f1 and lower limit outline f2. FIG. 5 shows that the point being between f1 and f2 means f1≦0 and f2≧0, while FIG. 6 shows that the starting point is always between f1 and f2. Thus, for A=(x, y+1), it has only to be determined whether or not f1≦0, and for B=(x+1, y), whether or not f2≧0 may be determined.

In this regard, there may be three cases, that is, A is within the range (case 1), A is not within the range but B is within it (case 2), and neither A nor B is within the range (case 3). To determine whether A or B is within the range, it does not matter whether A is examined before B or vice versa because a line of width 1 never allows both A and B to be within the range.

Figure 9:
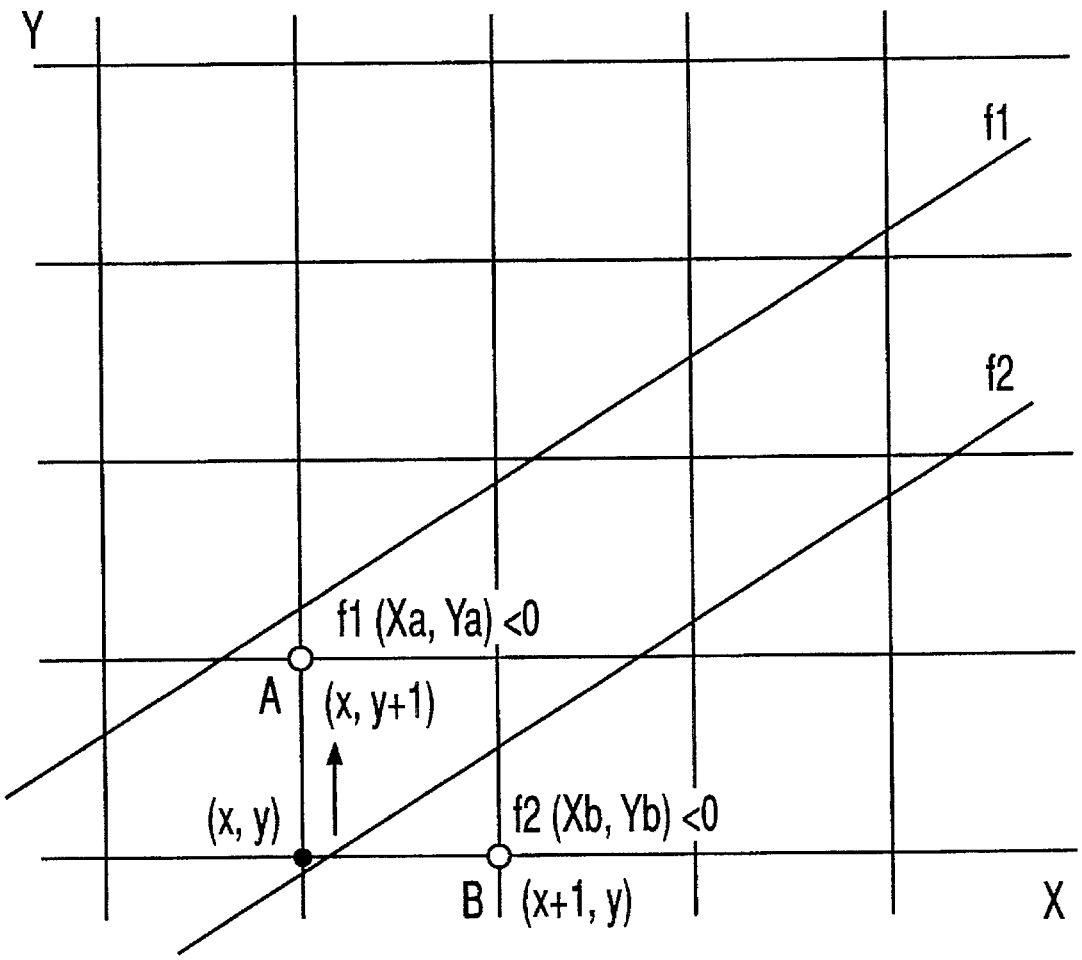
FIG. 9 illustrates the method of selecting the point next to the current point (x, y) according to this invention.

Case 1:

FIG. 9 shows an example of case 1. For FIG. 9 and subsequent figures, A=(x, y+1), the y coordinate value of which is incremented by 1 relative to the starting point, and B=(x+1, y), the x coordinate value of which is incremented by 1 relative to the starting point, are represented as (Xa, Ya) and (Xb, Yb), respectively. Furthermore, the value of f1 (Xa, Ya) and the value of f2 (Xb, Yb) are referred to as d1 and d2, respectively, which stand for determination parameters. These values are calculated when P=(x, y) is established as the starting point. For the example in FIG. 9, since f1 (Xa, Ya)<0, that is, the point A is below f1, the point A is plotted and selected as the next pixel.

In response to the selection of the point A as a new pixel, values are determined for the f1 (Xa, Ya) and f2 (Xb, Yb) to identify a pixel which is to follow the selected pixel. However, since the y coordinate value of the point A is incremented by 1 relative to the point P in FIG. 8, the determination parameters for the newly selected pixel are f1 (Xa, Ya+1) and f2 (Xa, Ya+1). However, these calculations are not required by returning to Equation 1. That is, as shown in Equation 1, incrementing (y) by 1 is equivalent to increasing the value of (f) by Δx and incrementing (x) by 1 is equal to reducing the value of (f) by Δy. Hence, determination parameters are updated using expressions f1=f1+Δx and f2=f2+Δx.

Figure 10:
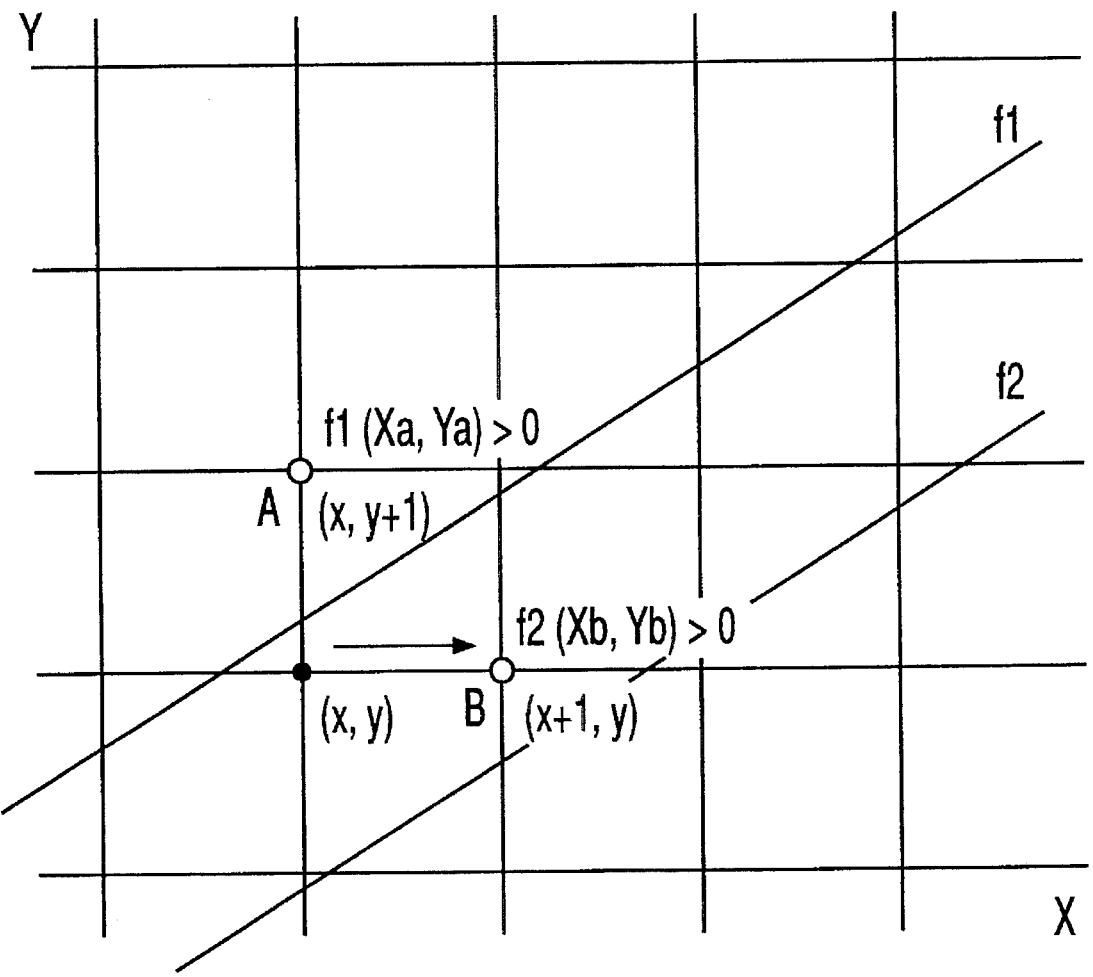
FIG. 10 illustrates the method of selecting the point next to the current point (x, y) according to this invention.

Case 2:

FIG. 10 shows an example of case 2. In this case, since f1 (Xa, Ya)>0, the point A is out of the range while since f2 (Xb, Yb)>0, the point B is within the range. Therefore, the point B is selected as the next pixel. However, since the x coordinate value of the point B is incremented by 1 relative to the point P in FIG. 8, the determination parameters for the newly selected pixel are f1 (Xa+1, Ya) and f2 (Xa+1, Ya). As previously described, calculations can be done using expressions f1 (Xa+1, Ya)= f1−Δy and f2 (Xa+1, Ya)= f2−Δy.

Figure 11:
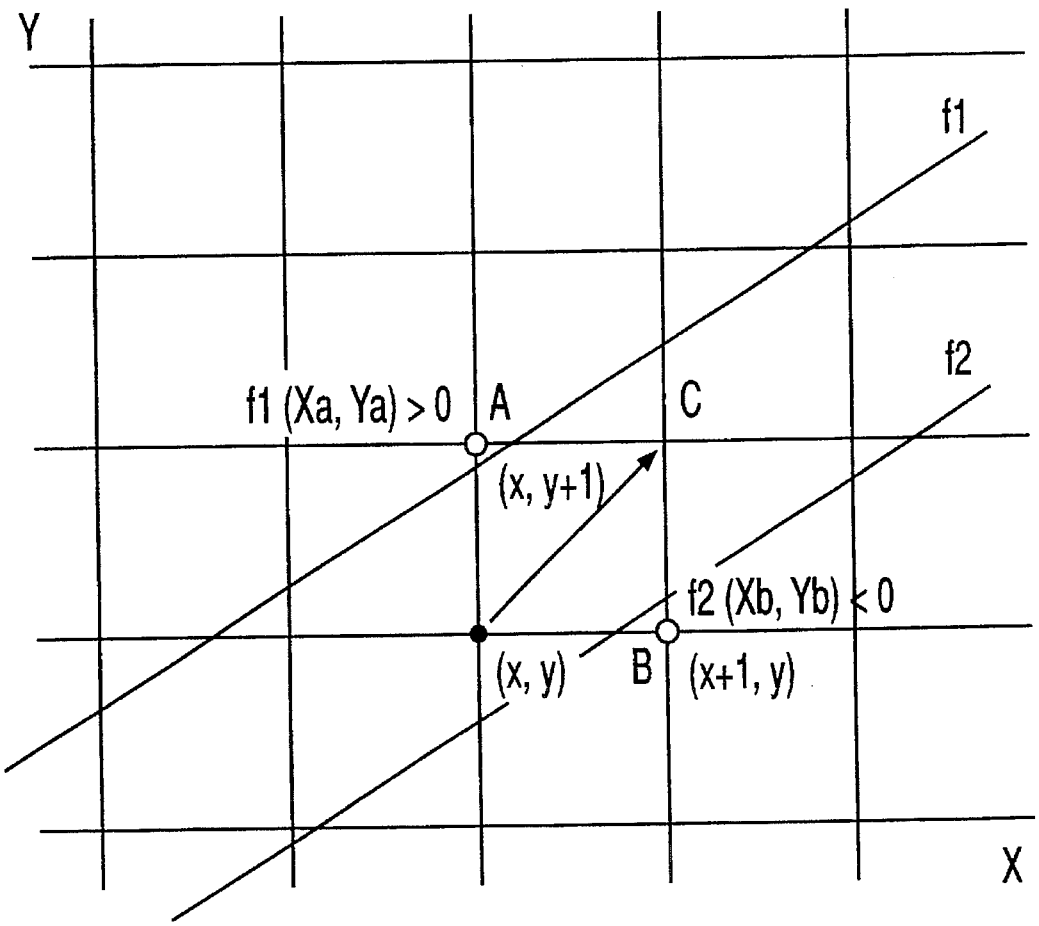
FIG. 11 illustrates the method of selecting the point next to the current point (x, y) according to this invention.

Case 3:

FIG. 11 shows an example of case 3. In this case, since f1 (Xa, Ya)<0, the point A is out of the range and since f2 (Xb, Yb)<0, the point B is also out of the range. Therefore, according to this invention, the point C, both of the x and y coordinate values of which are incremented by 1 relative to the point P, is plotted as the next pixel. And, since both the x and y coordinate values of the point C are greater than those of the point P in FIG. 8 by 1, the defemination parameters for the newly selected pixel are f1 (Xa+1, Ya+1) and f2 (Xa+1, Ya+1). As previously described, calculations can be done using expressions f1 (Xa+1, Ya+1)=f1+Δx−Δy and f2 (Xa+1, Ya+1)=f2+Δx−Δy.

Figure 12:
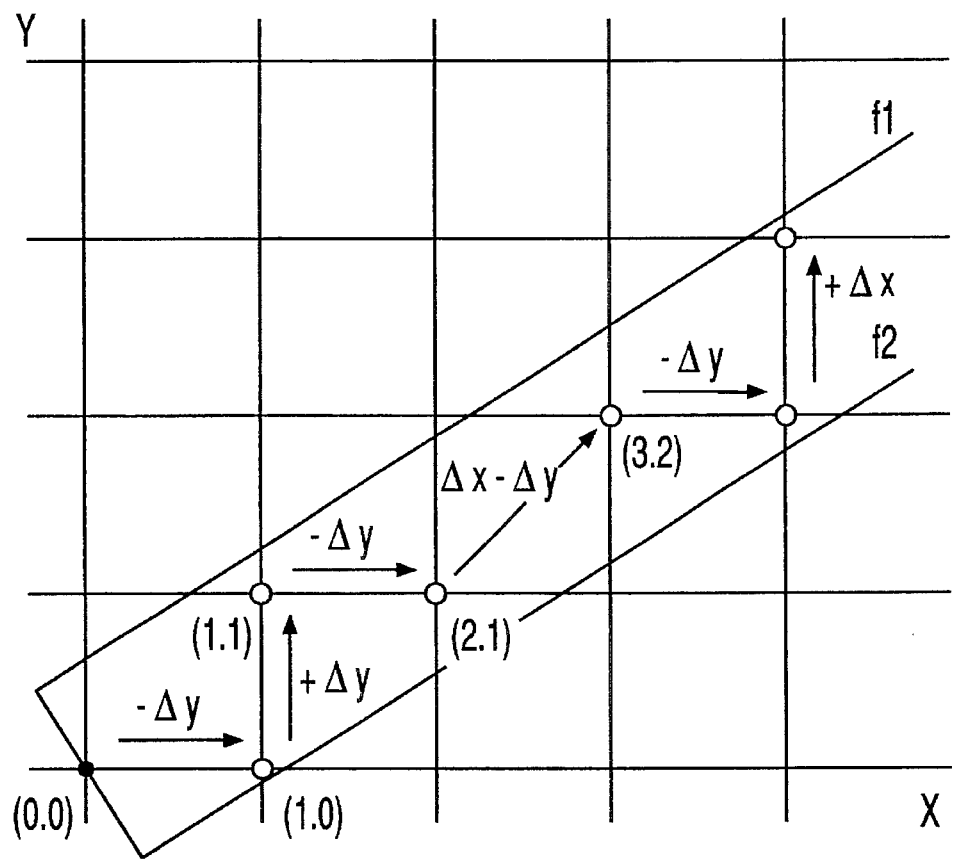
FIG. 12 illustrates the method of sequentially plotting pixels according to this invention.

FIG. 12 shows how pixels are sequentially plotted from the origin (0, 0) so that a straight line of width 1 is drawn. Pixels are sequentially plotted in this way and the drawing of a straight line terminates when the end point (Xe, Ye) is plotted.

Subsequent figures show a flow chart of the drawing of a straight line of width 1 according to this invention. It should be easy for those skilled in the art to implement a program drawing a straight line of width 1 on a computer according to this invention, using any computer programming language such as C, PASCAL, C++, or BASIC et al. pursuant to this flow chart. Alternatively, it may be easy to implement a logic equivalent to the flow chart using hard wired logic.

Figure 13:
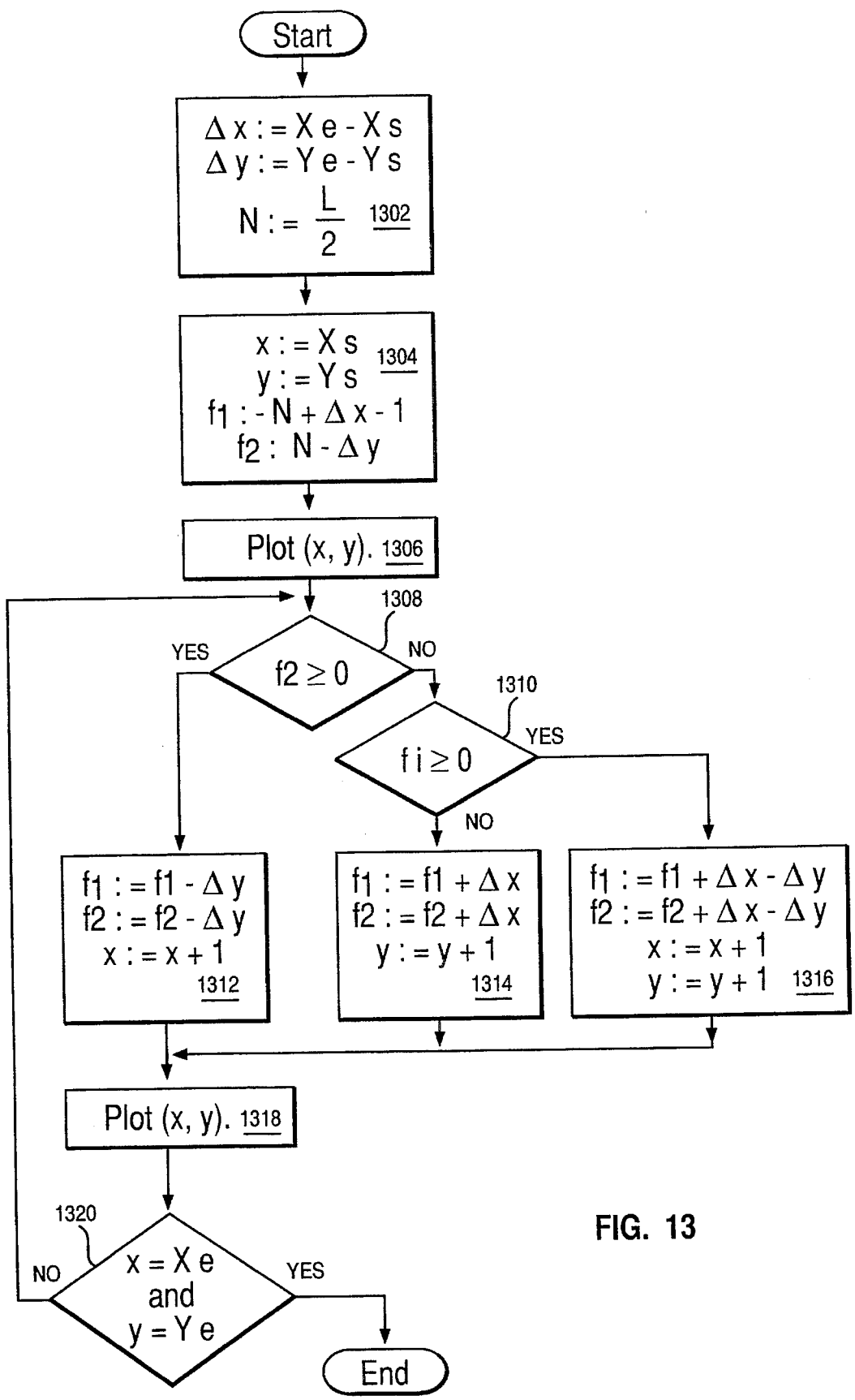
FIG. 13 is a flow chart of operations for drawing a straight line of width 1 according to this invention.

With reference to the flow chart in FIG. 13, at step 1302, the x coordinate of the end point minus the x coordinate of the starting point is stored in $\Delta x$ as a constant while the y coordinate of the end point minus the y coordinate of the starting point is stored in $\Delta y$ as a constant. In addition, half of the length L between the starting and end points is stored in a constant N. The meanings of these constants have been described in connection with FIG. 6. According to this invention, floating point operations are required only in this step wherein the length L must be determined and the rest can be fulfilled using only integer operations.

At step 1304, the x coordinate of a starting point is stored in a variable x while the y coordinate of the same point is stored in a variable y. This sets the current point (x, y) to the starting point. Furthermore, $N+\Delta x-1$ is stored in f1 as a determination parameter for determining the next point and $N-\Delta y$ is stored in f2. The significance of f1 and f2 has been described in connection with FIG. 6.

The reason why $-N+\Delta x-1$ is stored in f1 is described with reference to FIG. 6. That is, according to FIG. 6,

[Equation 5]

$$f1(x, y) = y \cdot \Delta x - x \cdot \Delta y - (Ys \cdot \Delta x - Xs \cdot \Delta y) - N$$

Since f1 is a determination parameter for a pixel immediately above the current point, initially f1 (x, y)= f1(Xs, Ys+1). Then, $f1=-N+\Delta x$.

However, the above f1 contains an extra term, $-1$. Such a term is added to substitute $f1 \geq 0$ for the comparison operation $f1>0$ in the subsequent step 1310 because some specific hard wired logic circuits perform processing faster for $f1 \geq 0$ than for $f1>0$. In general, however, it is allowable to use $f1=-N+\Delta x$ and to substitute the determination step of $f1>0$ for the comparison operation in step 1310. Similarly:

[Equation 6]

$$f2(x, y) = y \cdot \Delta x - x \cdot \Delta y - (Ys \cdot \Delta x - Xs \cdot \Delta y) - N$$

Since f2 is a determination parameter for a pixel immediately above the current point, initially f2 (x, y)= f2( Xs+1, Ys). Then, $f2=N-\Delta y$.

Step 1306 plots the pixel of the current point (Xs, Ys). Step 1308 then determines whether or not f2>0, and if so, determines without examining the value of f1 that this corresponds to the case of FIG. 10. This is because when the current point (x, y) is between f1 and f2 in FIG. 10, if f2>0, that is, the point (x+1, y) is between f1 and f2, the point (x, y+1) to be examined using the value of f1 is never between f1 and f2 because a line to be drawn has a width of 1.

If step 1308 indicates a positive determination, step 1312 is entered to subtract $\Delta y$ from both f1 and f2 as shown in FIG. 10 and to select as the next point the point whose x coordinate is incremented by 1.

If step 1308 does not determine that $f2 \geq 0$, step 1310 is entered to determine whether or not $f1 \geq 0$. If the determination is negative, this means that f1<0 and f2<0 and these conditions correspond to the case of FIG. 9. Step 1314 is then entered to add $\Delta x$ to both f1 and f2 as shown in FIG. 9 and to select as the next point the point whose y coordinate is incremented my 1.

If step 1308 makes a positive determination, step 1316 is entered. Since $f1 \geq 0$ and f2<0, this corresponds to the case of FIG. 11. Then, as shown in FIG. 11, $\Delta x-\Delta y$ is added to both f1 and f2 and the point with x and y coordinates incremented by 1 is selected as the next point.

Step 1318 plots the point (pixel) newly selected at step 1312, 1314, or 1316, and the next step 1320 determines whether or not the just plotted point is the end point. If so, processing ends and otherwise, it returns to step 1308 to determine whether or not $f2 \geq 0$.

The flow chart in FIG. 13 is prepared under the assumption that Xs<Xe and Ys<Ye. However, this invention is not limited by such a condition and is applicable to more general cases of the drawing of a straight line of width 1 by modifying the flow chart in FIG. 13 as follows, that is, applicable regardless of which is larger, Xs or Xe, or which is larger, Ys or Ye:

First a function ABS (X)=|X| which determines an absolute value for X and a function SGN (X) which determines the sign of X are defined. The value of SGN (X) is 1 for $X \geq 0$, and $-1$ for X<0. Then, the expressions in step 1302 in FIG. 13 are modified to $\Delta X := $ BS (Xe–Xs), $\Delta Y:=$ABS (Ye–Ys). Furthermore, step 1302 determines sx:=SGN (Xe–Xs) and sy:=SGN (Ye–Ys).

Then, x:=x+1, :+sy at steps 1312, 1314, and 1316 is modified to x:=x+sx, y:=(y+sy).

These modifications allow straight lines of width 1 to be drawn regardless of which is larger, Xs or Xe, or which is larger, Ys or Ye.

The equation of circle is $x^2+y^2=r^2$. Assumption is made that a circle of width 1 is drawn along a circle drawn according to the equation.

An equation for the outer outline is:

[Equation 7]

$$f1(x, y)=x^2+y^2-(r+0.5)^2$$

and an equation for the inner outline is:

[Equation 8]

$$f2(x, y)=x^2+y^2-(r-0.5)^2$$

Then, f1 (x, y)$\geq$0 indicates that the point (x, y) is outside the outer outline of the circle of width 1 to be drawn (that is, the pixel is not plotted). f1 (x, y)< 0 and f2 (x, y)$\geq$0 indicates that the point (x, y) is on the circle of width 1 to be drawn (that is, the pixel is plotted). f2 (x, y)<0 indicates that the point (x, y) is on the inner outline of the circle of width 1 to be drawn (that is, the pixel is not plotted).

A method of using the technique according to this invention to draw a one-fourth circular arc counterclockwise from point (r, 0) to point (0, r) in the fourth quadrant is described with reference to FIG. 14. In this case, the x coordinate value steadily decreases while the y coordinate value steadily increases. Therefore, there are three possible ways to select a next pixel to be plotted:

(i) Pixel with an x coordinate value decremented by 1.

(ii) Pixel with a y coordinate value incremented by 1.

(iii) Pixel with an x coordinate value decremented by 1 and a y coordinate value incremented by 1.

In this embodiment, either (i) or (ii) is used and the case (iii) is not considered to simplify the drawing processes. However, those skilled in the art should be able to assume, based on the following description, processes wherein the case (iii) is taken into consideration:

Actual circular arc drawing operations are now described with reference to the drawings. Once a pixel is plotted, the following must be checked in selecting the next pixel to be plotted:

(a) Whether or not the pixel immediately above the current pixel is below the outer outline f1. If the determination is positive, that pixel is selected as the next pixel and plotted.

(b) If the determination in (a) is negative, the pixel to the left of the current pixel is selected as the next pixel. However, this pixel cannot be immediately plotted and it must be determined whether or not it is above the inner outline f2. If so, it is plotted and otherwise, it is not plotted. Such an extra determination is performed to deal with points such as the point P3 in FIG. 14. This case, since the pixel immediately above the current pixel is above the outer outline f1, it cannot be selected as the next pixel and the one to the left of the current pixel is selected. Moreover, since it is not within the circular arc of width 1, it must not be plotted. In this case, the pixel immediately above the current pixel is selected before the one to the left thereof but the order may be reversed because circular arcs of width 1 never allow both pixels immediately above and to the left of the current pixel to be contained within the range. In FIG. 14, it is seen that the plotting of pixels starts with the point P0 and is sequentially performed for P1 to P10 (However, P3, P6, and P8 are not actually plotted because they are inside f2).

(c) Drawing is completed when the x coordinate value is zero and the y coordinate value is (r).

For the convenience of explanation, an assumption is made that a one-fourth circular arc of width 1 is drawn from (x, y)=(o, −r) to (x, y)=(r, 0). It is thus assumed that FIG. 14 is rotated 90 degrees clockwise around the origin. Then, the coordinates of the point P0 are (0, −r). In addition, the signs of the x and y coordinates are reversed. This operation is shown in FIG. 15.

[Equation 9]

$$f1(x, y)=x^2+y^2(r+0.5)^2$$

In this case, since f1 is a determination parameter for the pixel to the immediate right of the starting point, initially f1=f1 (1, −r)=−r−0.25.

However, this can be replaced by −r since f1 is defined as an integer. That is, if points on the outer outline are not plotted, f1<0 is required for pixels to be plotted. If a value 0.25 larger than f1 is smaller than 0, f1 itself is smaller than 0.

On the other hand, f2 is given by the following equation:
[Equation 10]

$$f2(x, y)=x^2+y^2-(r-0.5)^2$$

In this case, since f2 is a determination parameter for the starting point itself, initially f2=f2 (0, −r)= r−0.25.

However, this should be replaced by r−1 since f2 is defined as an integer. That is, if points on the inner outline are plotted, f2≧0 is required for pixels to be plotted. If a value 0.75 smaller than f2 is 0 or greater, f2 itself is 0 or greater.

Figure 16:
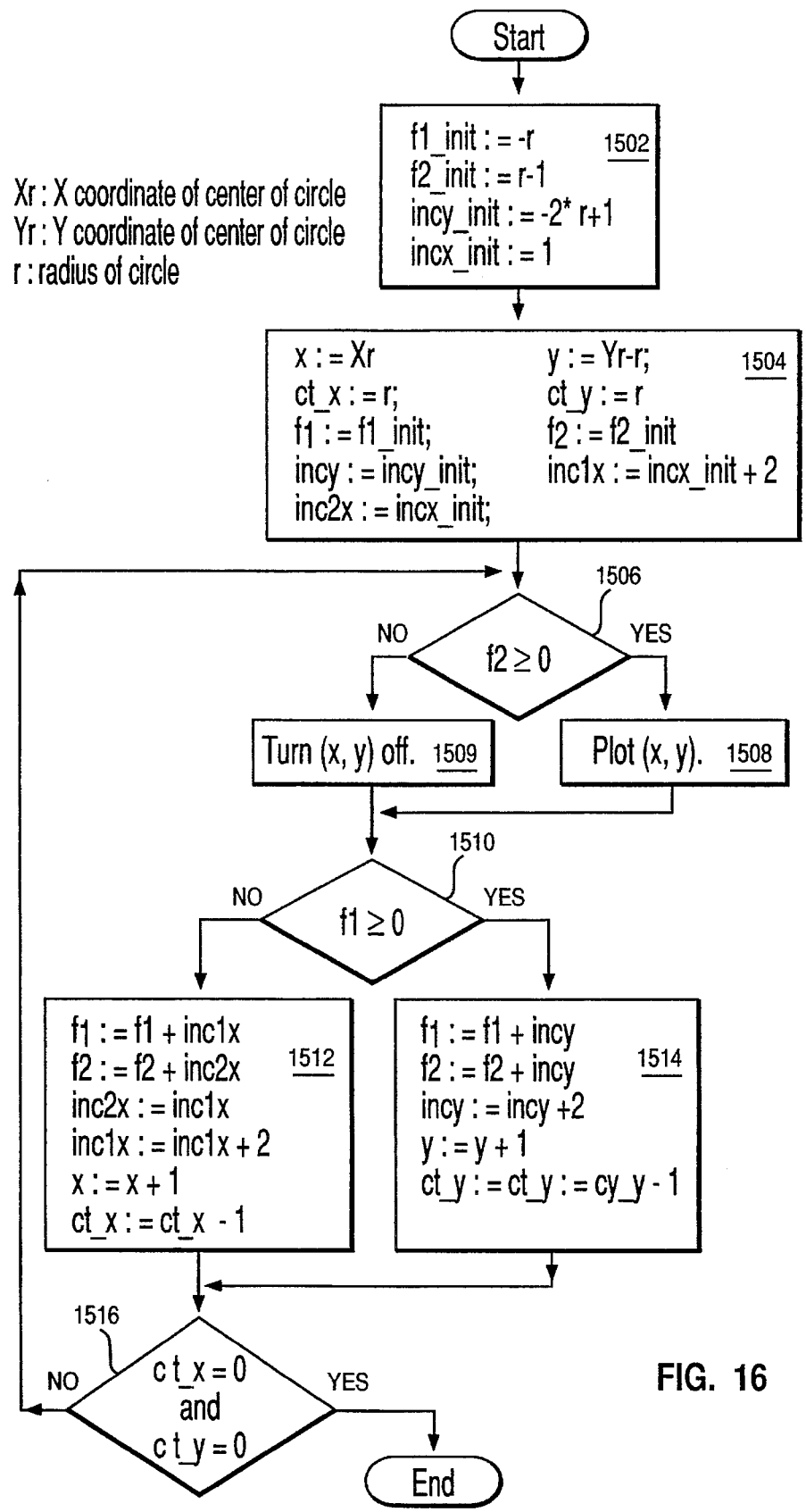
FIG. 16 is a flow chart of operations for drawing a circular arc of width 1 according to this invention.

In consideration of the above, step 1502 in FIG. 16 stores −r in f1_init, which indicates the initial value of f1 and stores r−1 in f2_init, which indicates the initial value of f2.

Then, the incrementation of f1 and f2 is considered. Generally, incrementing the x coordinate value by 1 in f (x, y)=x²+y²−r² means substituting x+1 for x. This is a simple calculation and results in f (x+1, y)= f (x, y)+2x+1.

Hence, augmenting the x coordinate value by 1 means adding 2x+1 to f. Similarly, f (x, y+1)=f (x, y)+ 2y+1.

Since (x, y)=(0, −r) is now assumed to be a plot starting point, the initial incremental values of f1 and f2 are −2*r+1 and 1, respectively. These values are stored in incy_init and incx_init, respectively.

Step 1504 sets the coordinates of the starting point for x and y and also sets (r) for a counter ct_x for the x direction and a counter ct_y for the y direction. ct_x is decremented by 1 each time the x coordinate value of the pixel is increased by 1 while ct_y is decremented by 1 each time the y coordinate value of the pixel is increased by 1. Drawing is completed when both counters ct_x and ct_y indicate zero at step 1516.

Furthermore, step 1504 sets f1_init for f1 and f2_init for f2. These f1 and f2 act correspondingly to the f1 and f2 in the flow chart for drawing straight lines in FIG. 13.

In addition, step 1504 stores incy_init in incy and incx_init+2 in inc1x. incy is used to increment both f1 and f2. inc1x is used to increment f1. The term+2 exists because in FIG. 15 the x coordinate value of the point P1 compared against f1 is 1 greater than that of the point Pz compared against f2. The term+2 represents this difference of the x coordinate. inc2x has incx_init stored in it. inc2x is used to increment f2.

Step 1506 determines whether or not f2≧0. If so, the pixel indicated as (x, y) is immediately plotted. This can be done immediately without waiting for determination for the value of f1 because when the later step 1510 determines that f1≧0, that is, the point, the x coordinate value of which is incremented by 1, is outside the outer outline, step 1514 selects as the next pixel a point, the y coordinate value of which is incremented by 1, instead of the x coordinate value to meet the condition of f1<0.

If step 1506 indicates a negative determination for f2≧0, step 1509 then turns the point (x, y) off, that is, plots the background color of the screen. Alternatively, step 1509 need not necessarily be provided and can be simply skipped. In FIG. 15, P3, P6, and P8 have a negative determination for f2≧0.

Step 1510 determines whether or not the point, the x coordinate value of which is incremented by 1 relative to the current pixel (in FIG. 15), is inside f1. If f1≧ 0, that is, the point, the x coordinate value of which is incremented by 1 relative to the current pixel, is outside f1, step 1514 is entered. In this case, both f1 and f2 are incremented by the value of incy, and incy itself is incremented by 2. This is because in
[Equation 11]

$$f1(x, y)=x^2+y^2-(r+0.5)^2$$

$$f2(x, y)=x^2+y^2-(r-0.5)^2,$$

$$f1(x, y+1)=f1(x, y)+zy+1 \text{ and } f2(x, y+1)=f2 (x, y)+2y+1, \text{ and thus } incy-2y+1.$$

Hence, each time y is incremented by 1, incy is increased by 2. Such increase in an incremental quantity itself also applies to the x coordinate.

Step 1514 also increments y by 1 to specify a new pixel and accordingly decrements ct_y by 1. This operation corresponds to, for example, the selection of P2 next to P3 in FIG. 15.

If step 1510 indicates a negative determination for f1≧0, that is, determines that f1<0, the next pixel is selected as P1 is selected next to P2 in FIG. 15. Step 1512 is then entered to add inc1x to f1 and inc2x to f2. Upon comparing step 1514 with step 1512, step 1514 has both f1 and f2 incremented by the value of incy, whereas the increment of f1 is 2 in step 1512 greater than that of f2. The reason is that as described in conjunction with step 1504, f1 always references a point, the x coordinate value of which is 1 greater than that of a point referenced by f2. To deal with this, inc2x:= inc1x and inc1x:=inc1x+2 are used. Step 1510 further increments x by 1 to specify a new pixel and accordingly decrements ct_x by 1.

Step 1516 determines whether or not both ct_x and ct_y are zero. If so, processing ends and otherwise, returns to the determination block in step 1506.

The flow chart in FIG. 16 represents the drawing of a one-fourth circular (fourth quadrant) arc shown in FIG. 15 wherein both the x and y coordinate values are incremented, but this is applicable to any quadrant. For example, if it is applied to the first quadrant shown in FIG. 14, the following changes are required:

(i) The starting point must be x: Xr+r and y:= Yr.

(ii) x:=x+1 must be replaced by y:=y−1.

(iii) y:=y+−1 must be replaced by x:=x+1.

For the second quadrant, (i) The starting point must be x:Xr and y:=Yr+ r.

(ii) x:=x+1 must be replaced by x:=x−1.

(iii) y:=y+1 must be replaced by y:=y−1.

For the third quadrant, (i) The starting point must be x:Xr−r and y:= Yr.

(ii) x:=x+1 must be replaced by y:=y−1.

(iii) y:=y+1 must be replaced by x:=x+1.

It is understood that for any quadrant, f1 and f2 may be used as they are without any modification to determine whether or not f1≧0 or f2≧0.

Furthermore, to draw a partial circular arc, a starting point must be specified and ct_x and ct_y must be set to values less than r.

Figure 14:
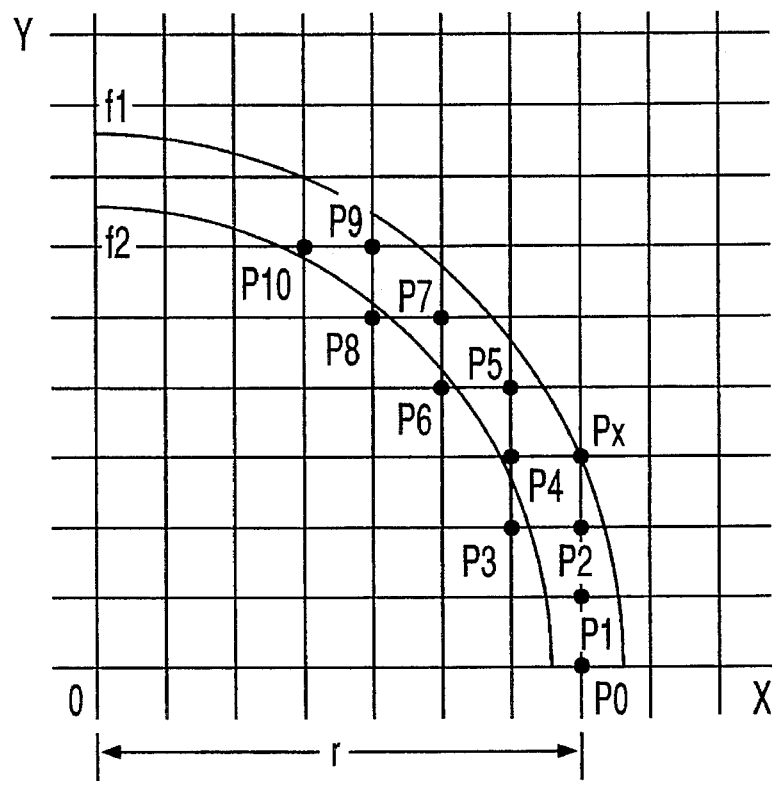
FIG. 14 illustrates the method of drawing a circular arc of width 1 according to this invention.
Figure 15:
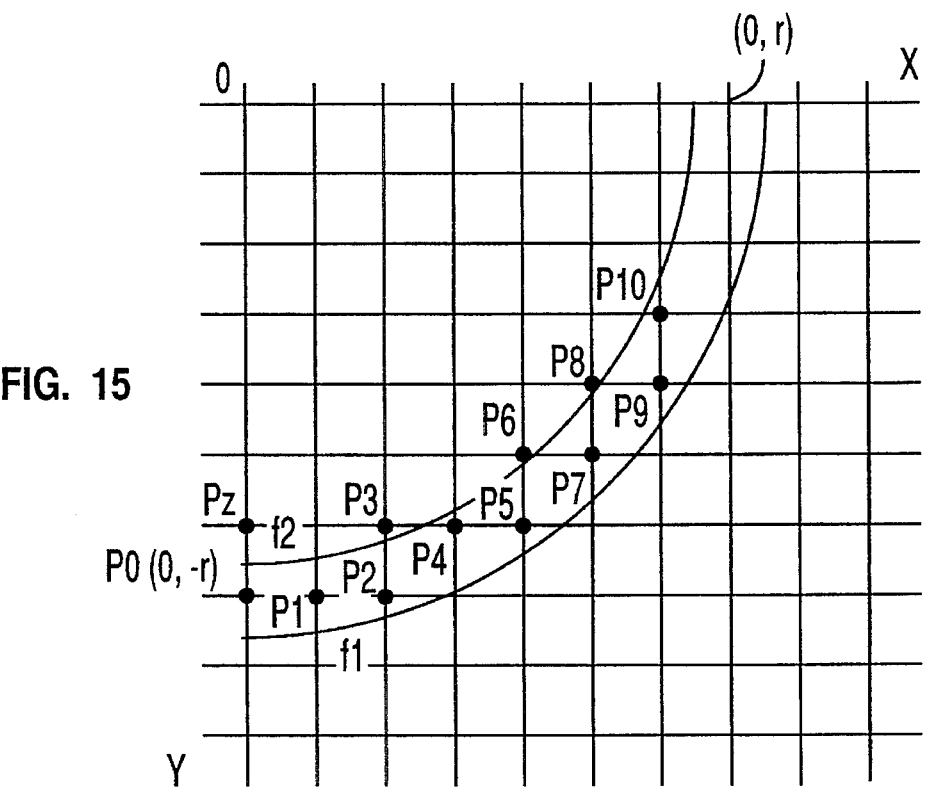
FIG. 15 illustrates the method of drawing a circular arc of width 1 according to this invention.

Essentially, in case of the drawing of an elliptic arc of width 1, the equation of the circle defined by f1 and f2 in FIG. 14 should be replaced by the equation of an ellipse.

Figure 17:
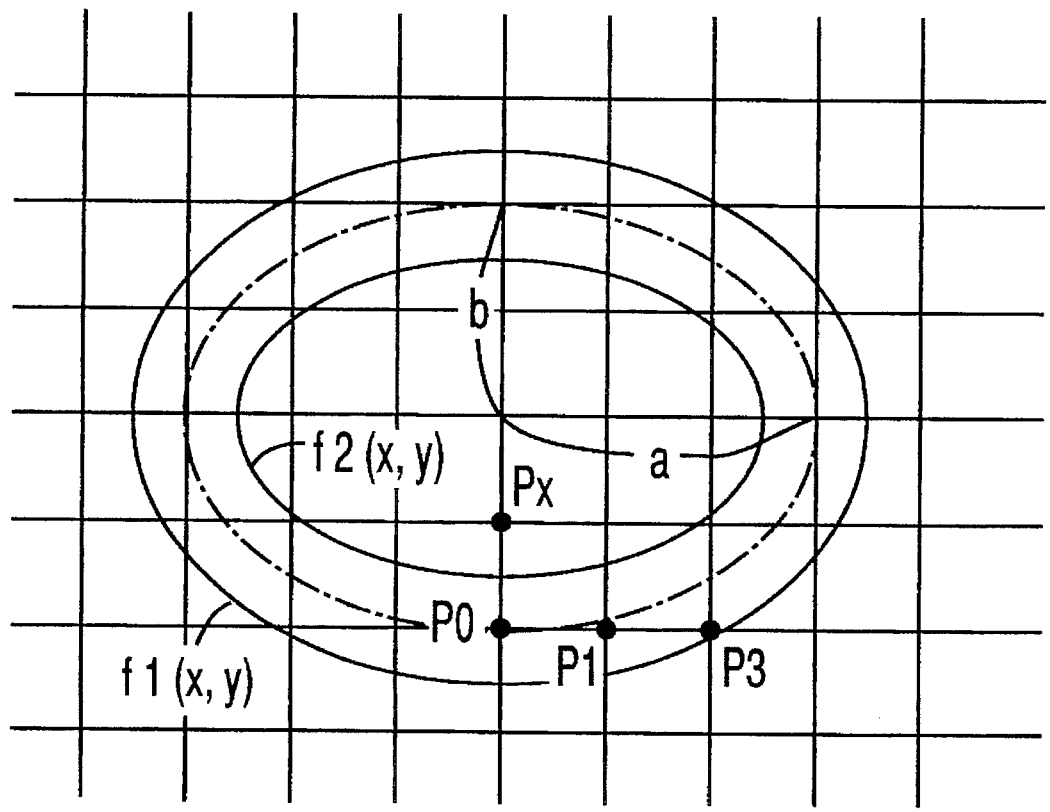
FIG. 17 illustrates the method of drawing an elliptic arc of width 1 according to this invention.

Referring to FIG. 17, there is shown an elliptic arc which intersects the x axis at (a, 0) and the y axis at (0, b) in the first quadrant. The equation of such an ellipse is given as follows:

[Equation 12]

$$x^2/a^2+y^2/b^2=1$$

Therefore, the equation f1 of the outer outline of an elliptic arc of width 1 and the equation f2 of the inner outline are given as shown in FIG. 17. Both sides of the equation f1 are multiplied by $(a+0.5)^2(b+0.5)^2$ and further multiplied by 16 so that the terms 0.5 can become integers. The right side is then subtracted from the left side, resulting in:

[Equation 13]

$$4(2b+1)^2x^2+4(2a+1)^2y^2-(2a+1)^2(2b+1)^2$$

The result of this calculation is referred to as d1 (x, y). The equation f2 is modified in a similar manner.

[Equation 14]

$$4(2b-1)^2x^2+4(2a-1)^2y^2-(2a-1)^2(2b-1)^2$$

The result of this calculation is referred to as d2 (x, y). Then if f1 and f2 are replaced by d1 and d2, respectively, in the flow chart for drawing a circular arc of width 1 in FIG. 16, the flow chart can be converted to one for drawing an elliptic arc of width 1.

Figure 18:
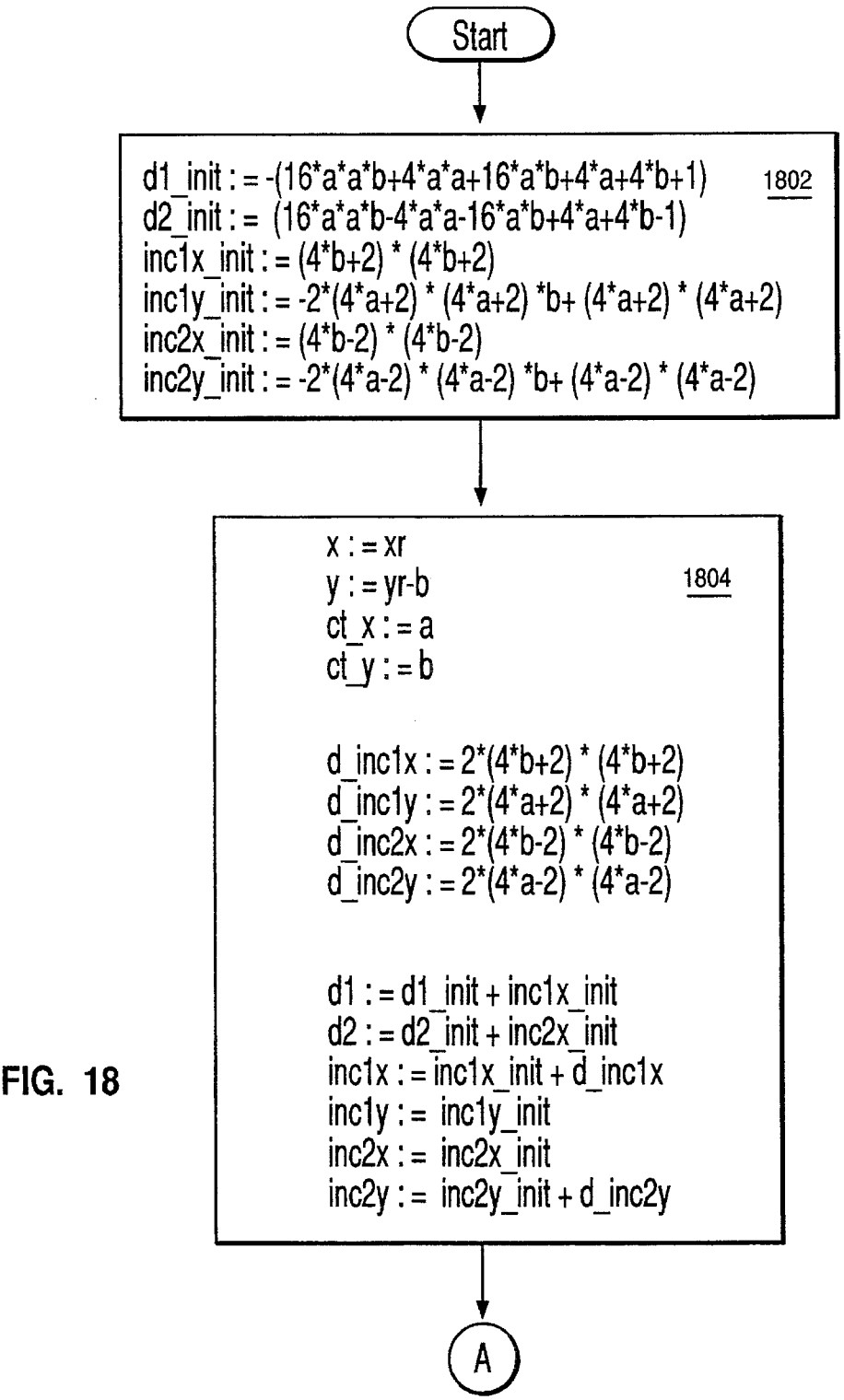
FIG. 18 is a flow chart of operations for drawing an elliptic arc of width 1 according to this invention.
Figure 19:
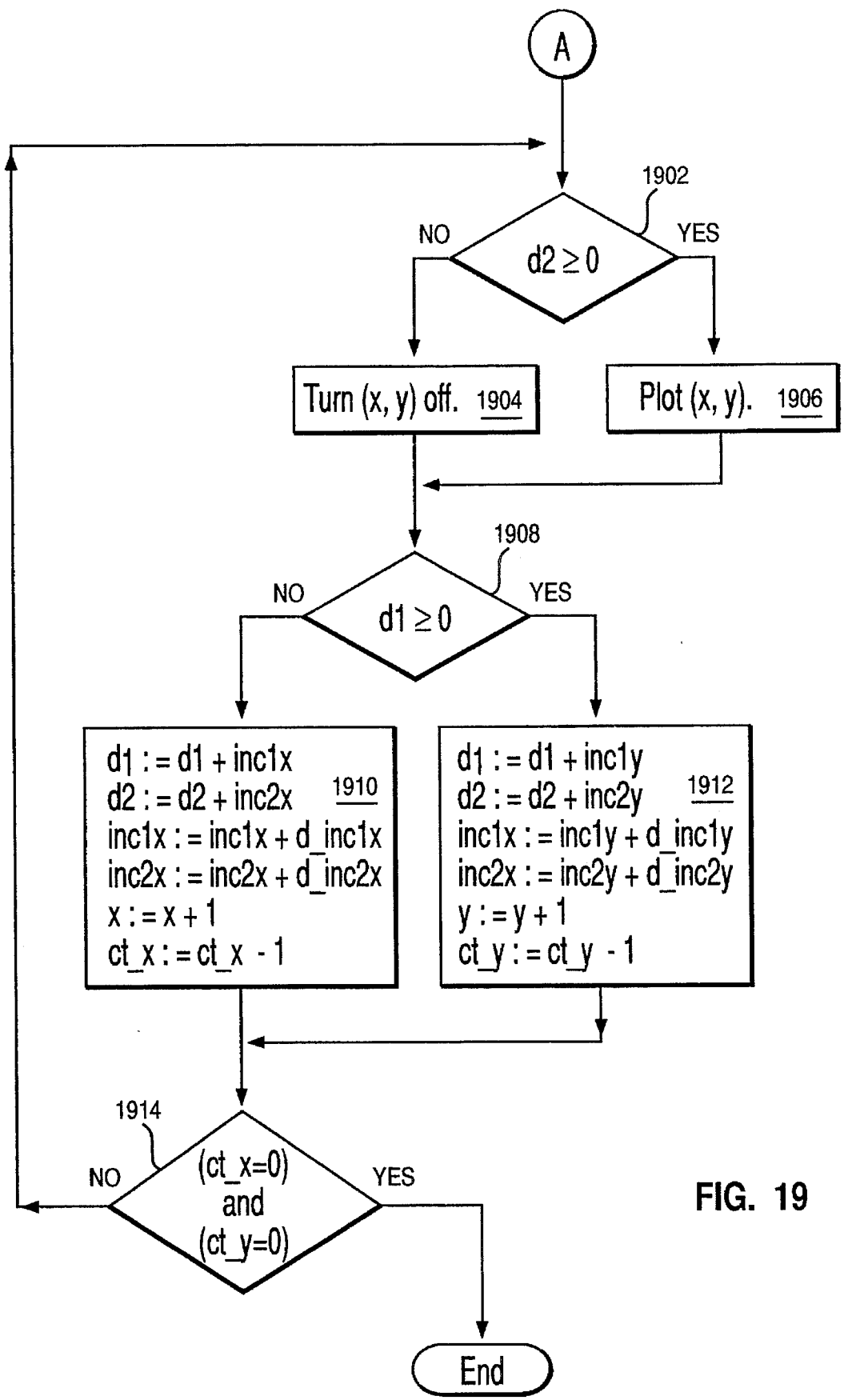
FIG. 19 is a flow chart of operations for drawing an elliptic arc of width 1 according to this invention.

With reference to the flow charts in FIGS. 18 and 19 and the figure of circular arc in FIG. 17, the processing required to draw an elliptic arc of width 1 is described. It is assumed that a one-fourth elliptic arc is drawn from (0, −b) to (0, a) in FIG. 17.

Step 1802 uses d1_init=d1(0. −b) and d2_init=d2 (0, −b) to determine the initial values of d1 and d2.

[Equation 15]

$$d1(x+1, y)=d1(x, y)+4(2b+1)^2(2x+1)$$

$$d1(x, y+1)=d1(x, y)+4(2a+1)^2(2y+1)$$

$$d2(x+1, y)=d2(x, y)+4(2b-1)^2(2x+1)$$

$$d2(x, y+1)=d2(x, y)+4(2a-1)^2(2y+1)$$

Thus, if the incrementation functions of d1 in the x and y directions are referred to as inc1x (x, y) and inc1y (x, y) and the incrementation functions of d2 in the x and y directions are referred to as inc2x (x, y) and inc2y (x, y),:

[Equation 16]

$$inc1x(x, y)=4(2b+1)^2(2x+1)$$

$$inc1y(x, y)=4(2a+1)^2(2y+1)$$

$$inc2x(x, y)=4(2b-1)^2(2x+1)$$

$$inc2y(x, y)=4(2a-1)^2(2y+1).$$

Step 1802 then computes inc1x_init=inc1x (0, −b), inc1y_init=inc1y (0, −b), inc2x_init=inc2x (0, −b) and inc2y_init=inc2y (0, −b) and stores the results as initial values.

Step 1804 stores the coordinates of the starting point Xr and Yr-b in x and y. Here, let the incremental quantity of 1 for the x coordinate of inc1x (x, y) be referred to as d_inc1x, the incremental quantity of 1 for the y coordinate of inc1y (x, y) be referred to as d_inc1y, the incremental quantity of 1 for the x coordinate of inc2x (x, y) be referred to as d_inc2x, and the incremental quality of 1 for the y coordinate of inc2y (x, y) be referred to as d_inc2y. In this respect, d_inc1x, d_inc1y, d_inc2x, and d_inc2y can be represented as shown in step 1804.

Step 1804 also stores d1_init plus inc1x_init in the variable d1 because a point, the position of which is compared against d1 (depicted as f1 in FIG. 17) has its x coordinate incremented by 1 relative to the current point (initially, PO). In addition, d2_init plus inc2y_init is stored in the variable d2 because a point whose position is compared against d2 (depicted as f2 in FIG. 17) has its y coordinate incremented by 1 relative to the current point (initially, PO).

Step 1804 further stores inc1x_init plus d_inc1x in inc1x for the same reason as stated above for d1. inc1y_init is simply stored in inc1y while inc1y_init is simply stored in inc2x. inc2x_init plus d_inc2y is stored in inc2y. d_inc2y is added to inc2x_init for the same reason as stated above for d2.

Turning to FIG. 19, step 1902 determines whether or not d2≧0. d2≧0 means that the point whose x coordinate is incremented by 1 relative to the current pixel is outside the inner outline f2 in FIG. 17. If d2≧0, step 1906 plots the pixel corresponding to (x, y) and otherwise, step 1904 plots the pixel corresponding to (x, y) as a background color or simply plots nothing. In this regard, step 1904 may be omitted.

Step 1908 determines whether or not d1≧0. d1≧0 means that the point whose x coordinate value is incremented by 1 relative to the current pixel is outside the outer outline f1. If d≧0, the point, the x coordinate of which is incremented by 1 relative to the current point should not be selected as the next pixel since it is not within the elliptic arc of width 1. Hence, y:=y+1 is executed and the point, the y coordinate of which is incremented by 1 relative to the current pixel is selected as the next pixel. In response to this incrementation of the y coordinate, inc1y is added to d1 and inc2y is added to d2. Furthermore, to prepare for subsequent processing, inc1y itself, which is an incremental quantity, is incremented by d_inc1y and inc2y itself is incremented by d_inc2y. The y direction increment counter ct_y is also decremented by 1.

If step 1908 makes a negative determination, that means that the point, the x coordinate of which is incremented by 1 relative to the current pixel, is inside the outer outline f1. Thus, x:=x+1 is executed and the point, the x coordinate of which is incremented by 1 relative to the current pixel, is selected as the next pixel. In response to this incrementation of the x coordinate, inc1x is added to d1 and inc2x is added to d2. Furthermore, to prepare for subsequent processing, inc1x itself, which is an incremental quantity, is incremented by d_inc1x and inc2x itself is incremented by d_inc2x. The x direction increment counter ct_x is also decremented by 1.

Step 1910 determines whether or not both counters ct_x and ct_y indicate zero. If so, processing ends, and otherwise, returns to the determination step 1902.

Having described the flow charts in FIG. 18 and 19 with respect to processing required to draw an elliptic arc in the fourth quadrant, changing the flow chart as described above for the circular arc allows an elliptic arc of width 1 to be drawn in any quadrant.

As described above, one feature of this invention allows straight lines of width 1 to be plotted as fast as the Bresenham's algorithm while substantially using only integer operations. Since generated straight lines of width 1 are more clear than and graphically superior to those drawn by the Bresenham's algorithm, this invention's ability to draw straight lines of width 1 substantially using only integer operations may be very significant for various graphics applications.

Furthermore, the Bresenham's algorithm for drawing circular arcs also has been known in the art. This algorithm allows circular arcs to be drawn substantially using only integer operations. However, if an attempt is made to fill the inside of a circle by using the Bresenham's algorithm to draw a plurality of concentric circles each of which have a diameter decremented by 1, some pixels remain unfilled like spots inside the circle. Using circular arcs of width 1 enables the inside of the circle to be perfectly filled using a plurality of concentric circles each of which having its diameter decremented by 1. Therefore, the use of circular arcs of width 1 is very advantageous in terms of graphical qualities. However, conventional methods to draw arcs of width 1 involve many operations including complicated square root calculations and thus draw such circular arcs very slowly, sometimes at an almost unallowable speed depending upon the speed of the CPU. However, another feature of this invention allows circular arcs of width 1 to be drawn quickly using substantially only integer operations. In fact, when the inventors made experiments using the same hardware configuration, it was found that the method for drawing a circular arc of width 1 according to this invention is several ten to hundred times faster than conventional methods.

What is claimed is:

1. A method for drawing a line by the operations of a computer on a display which allows pixels to be individually plotted at given coordinate points on said display, comprising the steps of:

(a) specifying a starting point and an end point of a line to be drawn; said line having, for at least part of its length, a positive slope greater than zero and less that 90°;

(b) defining an upper outline and a lower outline, said upper and lower outlines being lines spaced from said line by a selected amount W, where W is an amount greater than zero;

(c) setting said starting point as a current point;

(d) plotting a pixel corresponding to said current point on said display;

(e) determining if a first point and a second point are within a region between said upper outline and said lower outline, each one of said first and second points having an X component and a Y component, the X component of said first point being incremented by a value so that it comes closer to said end point than said current point, and the Y component of said second point being incremented by said value so that it comes closer to said end point than said current point, and, if said first point is within said region, setting said first point as a current point and returning to said step (d);

(f) setting said second point as a current point if said first point is outside said region and said second point is within said region, and returning to said step (d);

(g) setting a third point as a current point the X and Y components of which are both incremented by said value so that said third point comes closer to said end point than said current point if neither said first point nor said second point is within said region, and returning to said step (d); and (h) repeating said steps (d) to (g) until the current point is at or near said end point.

2. A method according to claim 1 wherein said value is +1.

3. An apparatus for drawing a line by the operations of a computer on a display which allows pixels to be individually plotted at given coordinate points, comprising:

(a) means for specifying a starting point and an end point of a line to be drawn; said line having, for at least part of its length, a positive slope greater than zero and less that 90°;

(b) means for defining art upper outline and a lower outline, said upper and lower outlines being lines spaced from said line by a selected amount W, where W is an amount greater than zero;

(c) means for setting said starting point as a current point;

(d) means for plotting the pixel corresponding to said current point on said display;

(e) means for determining if a first point and a second point are within a region between said upper outline and said lower outline, each of said first and second points having an X component and a Y component, the X component of said first point being incremented by a value so that the first point comes closer to said end point than said current point, and the Y component of said second point being incremented by said value so that the second point comes closer to said end point than said current point, and, if said first point is within said region, setting said first point as a current point and returning to said step (d);

(f) means for setting said second point as a current point if said first point is outside said region and said second point is within said region, and returning to said step (d);

(g) means for setting a third point as a current point, the X and Y components of which are incremented by said value so that it comes closer to said end point than said current point if neither said first point nor said second point is within said region, and returning to said step (d); and (h) means for repeating said steps (d) to (g) until the current point is at or near said end point.

4. Apparatus according to claim 2 wherein said value is +1.

* * * * *

UNITED STATES PATENT AND TRADEMARK OFFICE
CERTIFICATE OF CORRECTION

PATENT NO. : 5,502,801
DATED : March 26, 1996
INVENTOR(S) : Takayanagi et al.

It is certified that error appears in the above-indentified patent and that said Letters Patent is hereby corrected as shown below:

Column 14, line 44: change "art" to --an--

Signed and Sealed this

Thirteenth Day of August, 1996

Attest:

BRUCE LEHMAN

Attesting Officer

Commissioner of Patents and Trademarks